US009987630B2

(12) United States Patent
Inoue

(10) Patent No.: US 9,987,630 B2
(45) Date of Patent: Jun. 5, 2018

(54) FLUID HANDLING DEVICE AND METHOD OF USING THE SAME

(71) Applicant: Enplas Corporation, Saitama (JP)

(72) Inventor: Hayato Inoue, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 98 days.

(21) Appl. No.: 14/791,566

(22) Filed: Jul. 6, 2015

(65) Prior Publication Data

US 2016/0008806 A1 Jan. 14, 2016

(30) Foreign Application Priority Data

Jul. 9, 2014 (JP) ................................. 2014-141379

(51) Int. Cl.
*B01L 99/00* (2010.01)
*G01N 1/10* (2006.01)
*B01L 3/00* (2006.01)

(52) U.S. Cl.
CPC ... *B01L 3/502738* (2013.01); *B01L 2200/027* (2013.01); *B01L 2300/0816* (2013.01); *B01L 2300/0864* (2013.01); *B01L 2400/0406* (2013.01); *B01L 2400/0688* (2013.01)

(58) Field of Classification Search
CPC .................................. B01L 99/00; G01N 1/10
USPC .......... 422/50, 68.1, 502, 503, 504, 417, 81, 422/520, 521, 537, 507; 436/43, 174, 436/180
See application file for complete search history.

(56) References Cited

U.S. PATENT DOCUMENTS 6,368,562 B1 * 4/2002 Yao ....................... B01F 5/0604 422/504
6,951,632 B2 * 10/2005 Unger ................... B01L 3/0268 137/1
6,969,489 B2 * 11/2005 Freeman ............... B01L 3/5025 422/50
7,179,423 B2 * 2/2007 Bohm .................... B01D 57/02 422/50
7,189,580 B2 * 3/2007 Beebe ................. B01L 3/50273 137/12
7,189,581 B2 * 3/2007 Beebe ................. B01L 3/50273 137/12

(Continued)

FOREIGN PATENT DOCUMENTS

JP 2010-281645 12/2010
JP 2013-068546 A 4/2013

*Primary Examiner* — Brian J. Sines
(74) *Attorney, Agent, or Firm* — Brundidge & Stanger, P.C.

(57) ABSTRACT

A fluid handling device includes: a first channel through which liquid flows by capillarity; a liquid reservoir which communicates with an upstream end of the first channel and stores liquid; a liquid introduction part which communicates with the liquid reservoir and includes a taper part whose diameter decreases from an opening part toward the liquid reservoir; a stop valve disposed on a downstream end of the first channel and including a step part where a cross-sectional area of the channel in a direction orthogonal to a direction in which liquid flows discontinuously increases; and a second channel which communicates with a downstream end of the first channel, the second channel being a channel through which fluid flows.

4 Claims, 5 Drawing Sheets

(56) References Cited

U.S. PATENT DOCUMENTS

| | | | | |
|---|---|---|---|---|
| 7,214,348 | B2 * | 5/2007 | Desmond .............. B01L 3/5027 422/50 | |
| 8,231,844 | B2 * | 7/2012 | Gorfinkel .......... B01L 3/502715 422/502 | |
| 2003/0203506 | A1 * | 10/2003 | Beebe ................. B01L 3/50273 436/180 | |
| 2004/0115830 | A1 * | 6/2004 | Touzov ................... B01F 5/061 436/180 | |
| 2010/0288368 | A1 * | 11/2010 | Beebe ................. B01L 3/50273 137/12 | |

* cited by examiner

FLUID HANDLING DEVICE AND METHOD OF USING THE SAME

CROSS REFERENCE TO RELATED APPLICATIONS

This application is entitled to and claims the benefit of Japanese Patent Application No. 2014-141379, filed on Jul. 9, 2014, the disclosure of which including the specification, drawings and abstract is incorporated herein by reference in its entirety.

TECHNICAL FIELD

The present invention relates to a fluid handling device and a method of using the fluid handling device.

BACKGROUND ART

In recent years, microchannel chips have been used to accurately and speedily analyze a trace substance such as protein and nucleic acid. Microchannel chips advantageously allow the amount of reagents or samples to be small, and are expected to be used for various uses such as laboratory tests, food tests, and environment tests.

It has been proposed to provide a stop valve in a channel of a microchannel chip to stop liquid to be analyzed at a predetermined position in the microchannel chip (see, for example, PTL 1).

The microchannel chip disclosed in PTL 1 includes a channel through which liquid to be analyzed flows, an introduction part disposed on the upstream side of the channel and configured to introduce the liquid to the channel, a discharging part disposed on the downstream side of the channel and configured to discharge the liquid from the channel, and a stop valve disposed in the channel and configured to control the movement of the liquid in the channel. The stop valve is configured by providing a constricted part in the cross section of the channel that is perpendicular to the travelling direction of the liquid.

In the microchannel chip disclosed in PTL 1, liquid is dropped to the introduction part to fill the channel with liquid by capillarity. When the leading end of the advancing liquid reaches the stop valve, the channel is filled with the liquid from the introduction part to the stop valve. At this time, the leading end of the liquid forms a uniform interface because of the stop valve.

CITATION LIST

Patent Literature

PTL 1
Japanese Patent Application Laid-Open No. 2013-068546

SUMMARY OF INVENTION

Technical Problem

Liquid of various viscosity may be introduced in the microchannel chip disclosed in PTL 1 in accordance with the kind of inspection. For example, when highly viscous liquid is introduced from the introduction part, the highly viscous liquid dropped to the introduction part reaches the channel and then proceeds in the channel by capillarity. Thus, introduction of a desired amount of highly viscous liquid requires a long time.

An object of the present invention is to provide a fluid handling device in which liquid can be introduced to a predetermined position in a short time regardless of the viscosity (characteristics) of the liquid to be introduced. In addition, another object of the present invention is to provide a method of using the fluid handling device.

Solution to Problem

To achieve the above-mentioned object, a fluid handling device of an embodiment of the present invention includes a first channel through which liquid flows by capillarity; a liquid reservoir which communicates with an upstream end of the first channel and stores liquid; a liquid introduction part which communicates with the liquid reservoir and includes a taper part whose diameter decreases from an opening part toward the liquid reservoir; a stop valve disposed on a downstream end of the first channel and including a step part where a cross-sectional area of the channel in a direction orthogonal to a direction in which liquid flows discontinuously increases; and a second channel which communicates with a downstream end of the first channel, the second channel being a channel through which fluid flows.

In addition, to achieve the above-mentioned object, in a method of using a fluid handling device of an embodiment of the present invention, the fluid handling device includes: a first channel through which liquid flows by capillarity; a liquid reservoir which communicates with an upstream end of the first channel and stores liquid; a liquid introduction part which communicates with the liquid reservoir and includes a taper part whose diameter decreases from an opening part toward the liquid reservoir; a stop valve disposed on a downstream end of the first channel and including a step part where a cross-sectional area of the channel in a direction orthogonal to a direction in which liquid flows discontinuously increases; and a second channel which communicates with a downstream end of the first channel, the second channel being a channel through which fluid flows, the method including: pressing liquid into the liquid reservoir and a part of the first channel from a pipette tip that is inserted to the liquid introduction part in a state where the pipette tip is closely fitted to the taper part, and advancing the liquid in the first channel to the stop valve by capillarity by removing the pipette tip from the liquid introduction part, wherein $A<C<A+B$ is satisfied, where A represents a volume of the liquid reservoir, B represents a volume of the first channel, and C represents a volume of the liquid pressed into the liquid reservoir and the part of the first channel from the pipette tip.

Advantageous Effects of Invention

According to the present invention, it is possible to provide a fluid handling device in which liquid of any viscosity can be introduced to a predetermined position in a short time regardless of the viscosity (characteristics) of the liquid to be introduced. For example, according to the present invention, laboratory tests, food tests, environment tests and the like can be performed in a short time.

DESCRIPTION OF EMBODIMENTS

In the following, an embodiment of the present invention will be described in detail with reference to the accompanying drawings. In the following description, as a typical example of a fluid handling device of the embodiment of the present invention, a microchannel chip will be described.

(Configuration of Microchannel Chip)

Figure 1A:
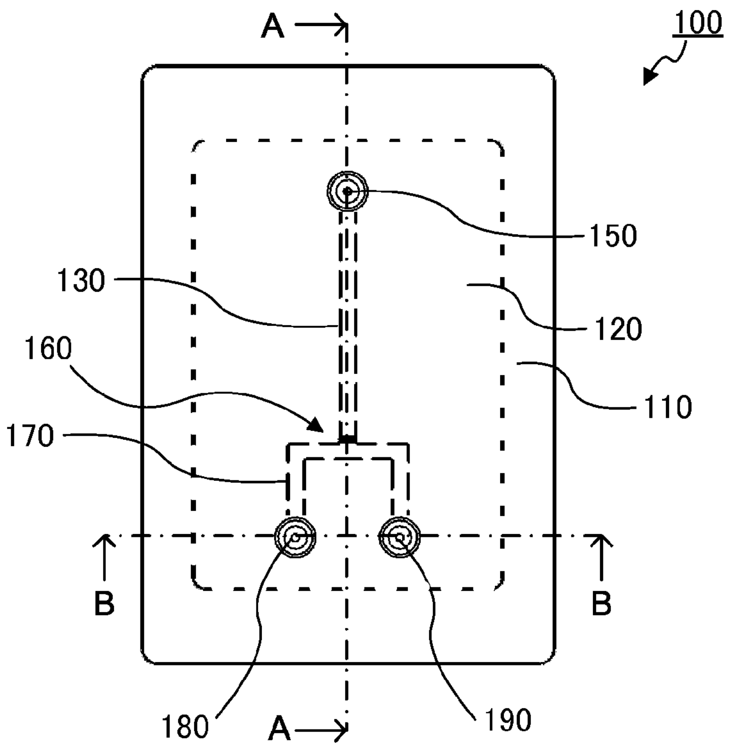
FIGS. 1A to 1C illustrate a configuration of a microchannel chip according to an embodiment of the present invention.
Figure 1B:
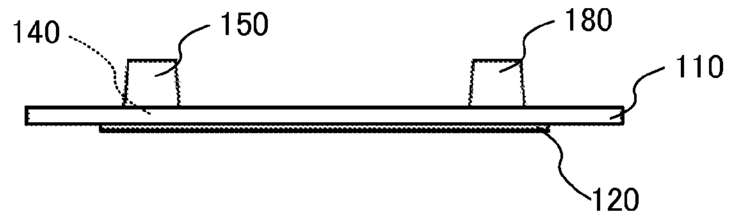
Figure 1C:
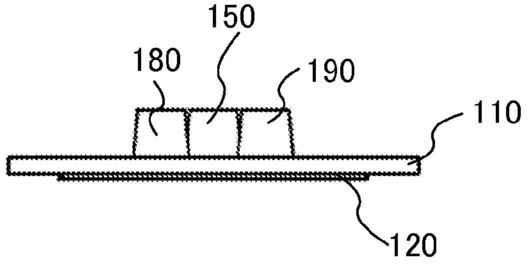
Figure 2A:
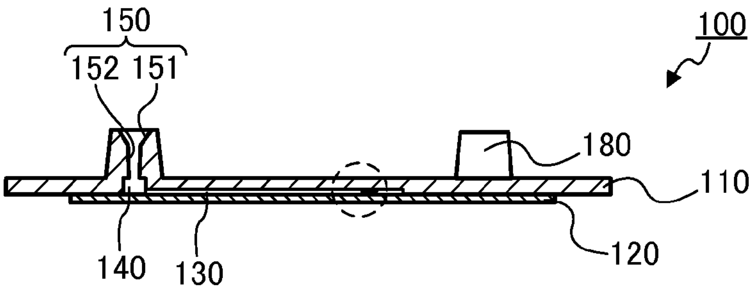
FIGS. 2A to 2C are sectional views of the microchannel chip.
Figure 2B:
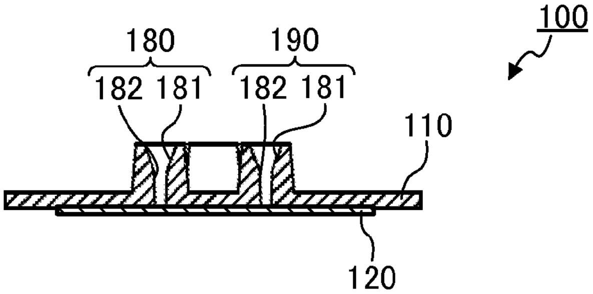
Figure 2C:
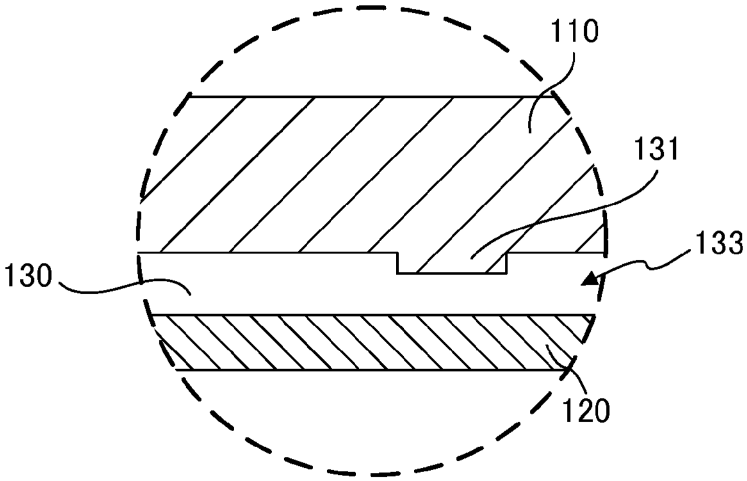
Figure 3A:
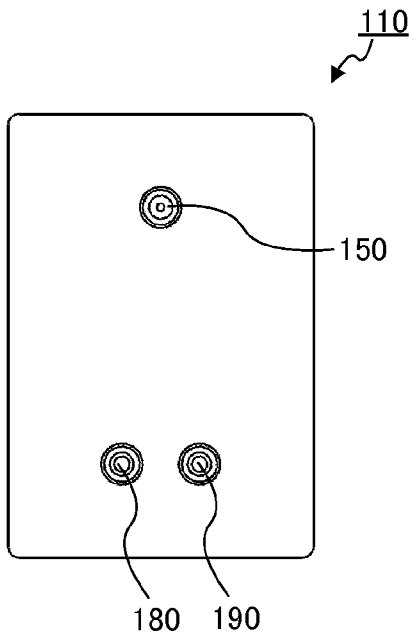
FIGS. 3A to 3D illustrate a configuration of a substrate.
Figure 3B:
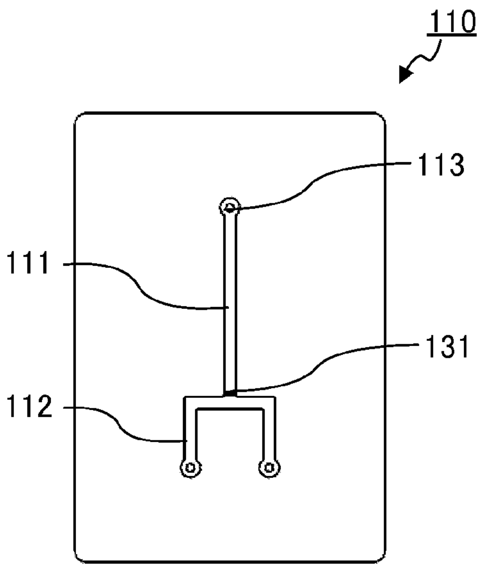
Figure 3D:
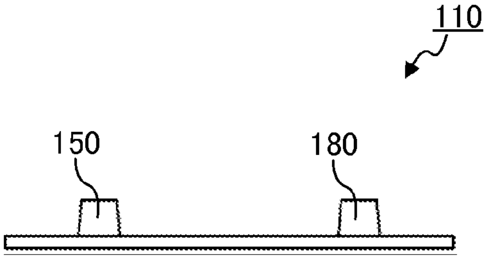
Figure 3C:
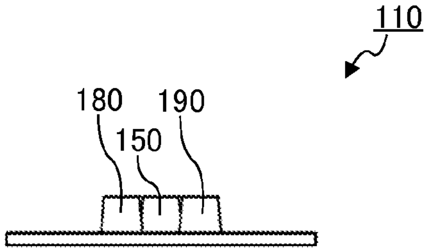

FIG. 1 to FIG. 3 illustrate a configuration of microchannel chip 100 according to an embodiment of the present invention. FIGS. 1A to 1C are a plan view, a side view, and a front view of microchannel chip 100, respectively. FIG. 2A is a sectional view taken along line A-A of FIG. 1A, FIG. 2B is a sectional view taken along line B-B of FIG. 1A, and FIG. 2C is a partially enlarged sectional view of a region of a broken line of FIG. 2A. FIGS. 3A to 3D are a plan view, a bottom view, a front view and a side view of substrate 110, respectively.

As illustrated in FIG. 1A to FIG. 2C, microchannel chip 100 includes substrate 110 and film 120. In addition, microchannel chip 100 includes first channel 130, liquid reservoir 140, liquid introduction part 150, stop valve 160, second channel 170, fluid introduction part 180 and fluid discharging part 190.

First channel 130 is a channel through which liquid flows. Any liquid can be introduced to first channel 130. Examples of the liquid include reagent, liquid sample, and the like. In addition, the viscosity of the liquid introduced to first channel 130 is not limited as long as the liquid can be advanced in first channel 130 by capillarity.

The upstream end of first channel 130 communicates with liquid reservoir 140 that stores liquid to be introduced. In addition, stop valve 160 that stops advancement of liquid is disposed at the downstream end of first channel 130. Further, the downstream end of first channel 130 opens at an internal wall of second channel 170.

First channel 130 is a channel that allows liquid to move therethrough by capillarity. The cross-sectional area and cross-sectional shape of first channel 130 is not limited as long as liquid can move therethrough by capillarity. The cross-sectional shape of first channel 130 is, for example, a substantially rectangular shape with each side (width and depth) having a length of about several micrometers to several millimeters. In the present embodiment, first channel 130 has a width of 1.0 mm, a depth of 0.1 mm, a cross-sectional area of 0.1 $mm^2$, and a volume of 1.2 μL. It is to be noted that the term "cross section of the channel" used herein means the cross section of the channel which is orthogonal to the direction in which liquid (fluid) flows.

Liquid reservoir 140 is connected with the upstream end of first channel 130. Liquid reservoir 140 temporarily stores liquid. The upstream end of liquid reservoir 140 communicates with liquid introduction part 150, and the downstream end of liquid reservoir 140 is connected with first channel 130. In the direction orthogonal to the direction in which liquid flows in the connecting part between liquid reservoir 140 and liquid introduction part 150, the area of an opening of the connecting part on liquid reservoir 140 side is preferably smaller than the cross-sectional area of liquid reservoir 140. In addition, as long as the above-described condition of the cross-sectional area is satisfied and a predetermined amount of liquid can be temporarily stored, the shape, volume, and the like of liquid reservoir 140 is not limited, and may be appropriately set in accordance with the use. In the present embodiment, liquid reservoir 140 has a columnar shape, and a volume of 1.6 μL.

Liquid introduction part 150 is an inlet for introducing liquid to first channel 130 and liquid reservoir 140. Liquid introduction part 150 includes first taper part 151 on the upstream side, and second taper part 152 on the downstream side that is connected with the downstream end of first taper part 151.

First taper part 151 functions as a guide for inserting micro tip 200 of a micro pipette and the like to liquid introduction part 150. First taper part 151 is disposed on the upstream side of liquid introduction part 150. The upstream end of first taper part 151 opens to the outside, and the downstream end of first taper part 151 is connected with second taper part 152. The diameter of first taper part 151 gradually decreases from the opening part of the upstream end toward second taper part 152 (or liquid reservoir 140). The inclination angle of first taper part 151 to the central axis is not limited. In the present embodiment, the inclination angle of first taper part 151 to the central axis is 37 degrees.

Second taper part 152 is disposed on the downstream side of liquid introduction part 150. The upstream end of second taper part 152 is connected with the downstream end of first taper part 151, and the downstream end of second taper part 152 is connected with liquid reservoir 140. In comparison with first taper part 151, the inclination angle of second taper part 152 to the central axis is small, and thus function of fitting micro tip 200 of a micro pipette is achieved. In the present embodiment, the angle of second taper part 152 to the central axis is two degrees. The axial length of second taper part 152 is not limited, and may be appropriately set in accordance with micro tip 200 to be used and the like. Preferably, micro tip 200 is formed to have such a diameter (internal diameter) and an axial length that the end of micro tip 200 does not reach liquid reservoir 140 but stops in second taper part 152.

Stop valve 160 is disposed at the downstream end of first channel 130, and stops the liquid that is advanced to first channel 130 by capillarity. Stop valve 160 includes step part 133 whose cross-sectional area in the direction orthogonal to the direction in which liquid flows discontinuity increases.

Step part 133 is not limited as long as step part 133 has such a size that liquid advanced to first channel 130 is stopped by step part 133. In the present embodiment, protrusion 131 is formed at the downstream end of the top surface of first channel 130 to form a portion where the cross-sectional area is locally small, and the downstream side relative to protrusion 131 serves as step part 133.

Second channel 170 is a channel through which liquid such as reagent or fluid such as gas flow. The upstream end of second channel 170 is connected with fluid introduction part 180 for introducing fluid, and the downstream end of second channel 170 is connected with fluid discharging part 190 for discharging introduced fluid. In addition, the downstream end of first channel 130 joins second channel 170.

The cross-sectional area and cross-sectional shape of second channel 170 are not limited. For example, second channel 170 is a channel that allows fluid to move therethrough by capillarity. In this case, the cross-sectional shape of second channel 170 is, for example, a substantially rectangular shape with each side (width and depth) having a length of about several micrometers to several millimeters.

In the present embodiment, second channel 170 has a width of 1.0 mm, a depth of 0.1 mm, a cross-sectional area of 0.1 $mm^2$, and a volume of 2.0 μL.

Next, fluid introduction part 180 and fluid discharging part 190 will be described. Fluid introduction part 180 and fluid discharging part 190 have the same structure.

Fluid introduction part 180 is an inlet configured to introduce fluid to second channel 170. The downstream end of fluid introduction part 180 communicates with the upstream end of second channel 170. Fluid introduction part 180 includes third taper part 181 on the upstream side, and fourth taper part 182 on the downstream side that communicates with third taper part 181.

Third taper part 181 functions as a guide for inserting micro tip 200 of a micro pipette and the like to fluid introduction part 180. Third taper part 181 is disposed on the upstream side of fluid introduction part 180. The diameter of third taper part 181 decreases from the opening part of the upstream end toward second channel 170 (fourth taper part 182).

Fourth taper part 182 is disposed on the downstream side of fluid introduction part 180. For example, micro tip 200 of a micro pipette or the like is inserted to fourth taper part 182 without gap therebetween, and an end portion of micro tip 200 is fitted to fourth taper part 182. The upstream end of fourth taper part 182 communicates with the downstream end of third taper part 181, and the downstream end of fourth taper part 182 communicates with second channel 170.

Fluid discharging part 190 is an outlet configured to discharge fluid from second channel 170. Fluid discharging part 190 functions also as air hole intended for the case where liquid is introduced to first channel 130 and the case where fluid is introduced to second channel 170. The upstream end of fluid discharging part 190 communicates with the downstream end of second channel 170. Fluid discharging part 190 includes third taper part 181 on the downstream side, and fourth taper part 182 on the upstream side that communicates with third taper part 181.

FIGS. 3A to 3D illustrate a configuration of substrate 110. FIGS. 3A to 3D are a plan view, a bottom view, a front view, and a side view of substrate 110, respectively.

As illustrated in FIGS. 3A to 3D, substrate 110 is a transparent resin substrate having a substantially rectangular shape. Substrate 110 includes first groove 111 provided with protrusion 131, second groove 112, first recess 113, fluid introduction part 180 and fluid discharging part 190. One end (upstream end) of first groove 111 communicates with first recess 113, and the other end (downstream end) of first groove 111 communicates with second groove 112. One end (upstream end) of second groove 112 communicates with fluid introduction part 180, and the other end (downstream end) of second groove 112 communicates with fluid discharging part 190. On the surface opposite to the surface on which first groove 111, second groove 112 and first recess 113 are formed, liquid introduction part 150, fluid introduction part 180 and fluid discharging part 190 are disposed.

The thickness of substrate 110 in the region where liquid introduction part 150, fluid introduction part 180 and fluid discharging part 190 are not disposed is not limited, and is, for example, 1 mm to 10 mm both inclusive. In addition, the kind of the resin composing substrate 110 is not limited, and may be appropriately selected from publicly known resins. Examples of the resin composing substrate 110 include polyethylene terephthalate, polycarbonate, polymethylmethacrylate, vinyl chloride, polypropylene, polyether, polyethylene, polystyrene, silicone resin, and elastomer.

When the opening parts of first groove 111, second groove 112 and first recess 113 are sealed with film 120, first channel 130, second channel 170, stop valve 160 and liquid reservoir 140 are formed.

Film 120 is a transparent resin film having a substantially rectangular shape. Film 120 is bonded on the surface of substrate 110 on which first groove 111, second groove 112 and first recess 113 are formed. The kind of the resin composing film 120 is not limited and may be appropriately selected from publicly known resins as long as the surface (the surface serving as the internal wall of the channel) that allows liquid to advance first channel 130 by capillarity, the adhesion strength to the substrate 110, and the tolerance against the heat history and reagent during various processes can be ensured. Examples of the resin composing film 120 include polyethylene terephthalate, polycarbonate, polymethylmethacrylate, vinyl chloride, polypropylene, polyether, polyethylene, polystyrene, and silicone resin. The thickness of film 120 is not limited as long as the above-described function can be achieved, and may be appropriately set in accordance with the kind (stiffness) of the resin. In the present embodiment, film 120 has a thickness of about 20 μm.

(Manufacturing Method of Microchannel Chip)

For example, substrate 110 can be manufactured by the injection molding method using the above-described resin. Microchannel chip 100 can be manufactured by joining film 120 to the surface of manufactured substrate 110 on which first groove 111, second groove 112 and first recess 113 have been formed by thermo compression bonding.

(Method of Using Microchannel Chip)

Figure 4:
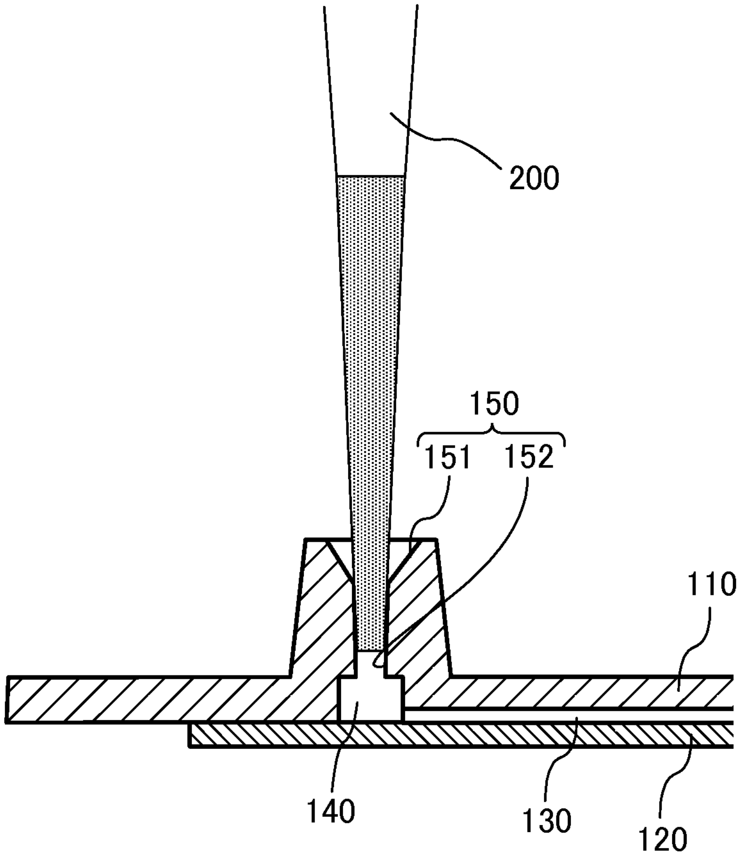
FIG. 4 is an explanatory view of a method of using the microchannel chip.

Next, a method of using (usage) of microchannel chip 100 will be described. FIG. 4 and FIGS. 5A to 5D are explanatory views of the usage of microchannel chip 100. FIG. 4 is a sectional view illustrating a state where a micro tip is inserted to liquid introduction part 180. FIGS. 5A to 5D illustrate processes of introducing two kinds of liquid to the microchannel chip. It is to be noted that in FIGS. 5A to 5D, only first channel 130, stop valve 160 and second channel 170 are illustrated.

As illustrated in FIG. 4, first, micro tip 200 of a micro pipette filled with liquid is inserted to liquid introduction part 150. To be more specific, first taper part 151 is used as a guide to guide an end of micro tip 200 toward second taper part 152. When the end of micro tip 200 reaches second taper part 152, micro tip 200 is pressed into liquid reservoir 140. At this time, the outer peripheral surface of micro tip 200 and second taper part 152 are closely fitted together and micro tip 200 is fixed to liquid introduction part 150.

Next, with the external pressure, liquid in micro tip 200 is introduced to liquid reservoir 140 and first channel 130. Here, amount C of liquid to be introduced satisfies $A<C<A+B$ where A represents the volume of liquid reservoir 140 and B represents the volume of first channel 130. To be more specific, liquid is firstly supplied to liquid reservoir 140. When liquid is further introduced in the state where liquid reservoir 140 is filled with liquid, supply of liquid into first channel 130 is started. When liquid is supplied to first channel 130 to a certain degree, supply of liquid is stopped (see FIG. 5A). At this time, since liquid introduction part 150 side is sealed with micro tip 200, the liquid of first channel 130 does not advances by capillarity.

Next, micro tip 200 is removed from first taper part 151. Then, since liquid introduction part 150 side is opened, the liquid in first channel 130 is advanced toward stop valve 160 (downstream) by capillarity, and the liquid in liquid reservoir 140 is drawn into first channel 130. The liquid having advanced in first channel 130 stops at the downstream end of step part 133 of stop valve 160 where the cross-sectional area of first channel 130 sharply increases (see FIG. 5B). At this time, the leading end of the liquid stopped at stop valve 160 forms a uniform and appropriate interface.

Next, liquid is introduced to second channel 170. Micro tip 200 of a micro pipette filled with liquid is inserted to fluid introduction part 180. To be more specific, third taper part 181 is used as a guide to guide an end of micro tip 200 toward fourth taper part 182. When the end of micro tip 200 reaches fourth taper part 182, micro tip 200 is pressed into second channel 170. At this time, the outer peripheral surface of micro tip 200 and fourth taper part 182 are closely fitted together without gap therebetween, and micro tip 200 is fixed to fluid introduction part 180.

Figure 5A:
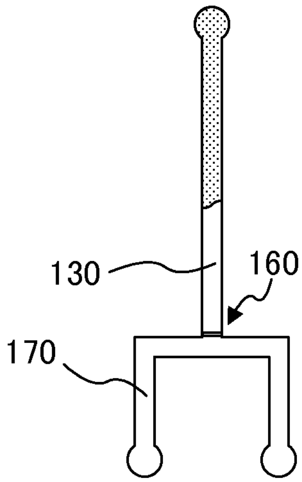
FIGS. 5A to 5D are explanatory views of the method of using the microchannel chip.
Figure 5B:
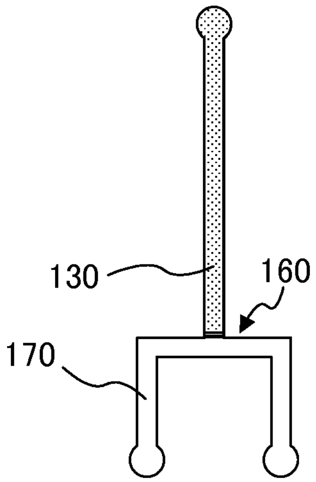
Figure 5C:
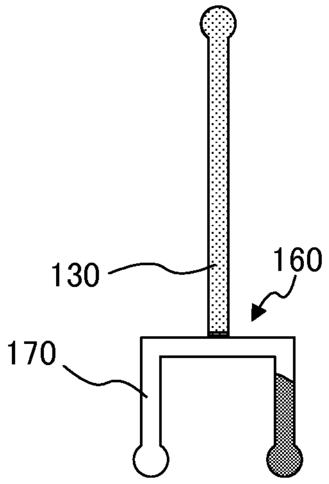
Figure 5D:
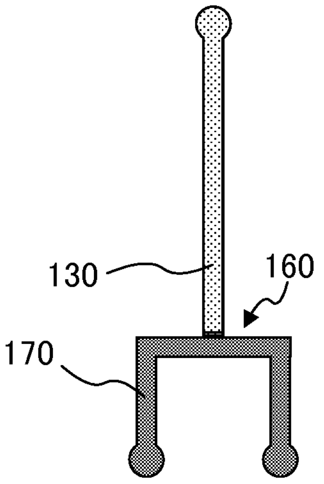

Next, by the external pressure or by capillarity, liquid is introduced to fill second channel 170 (see FIG. 5C). When second channel 170 is filled with liquid, the liquid introduced to second channel 170 makes contact with the liquid surface formed at the downstream end of first channel 130 to form a liquid-liquid interface (see FIG. 5D).

Through the above-mentioned procedures, by introducing liquid to first channel 130 and second channel 170, a liquid-liquid interface can be formed at a predetermined position in a short time. The liquid-liquid interface thus formed can be used for chemical reactions, molecular diffusion and the like, for example.

While two kinds of liquid is introduced in the present embodiment, the fluid introduced to second channel 170 may be gas. In this case, gas-liquid interface can be formed at a predetermined position in a short time.

(Effect)

In microchannel chip 100 of the present embodiment, liquid introduction part 150 including first taper part 151 communicates with liquid reservoir 140, and first channel 130 is provided with stop valve 160. Since liquid is pressed into first channel 130 to a middle of first channel 130, liquid can be introduced to a predetermined position in a short time regardless of the viscosity (characteristics) of the liquid to be introduced.

INDUSTRIAL APPLICABILITY

The fluid handling device of the embodiment of the present invention is suitable for microchannel chips used in scientific fields, medical fields and the like, for example.

REFERENCE SIGNS LIST

100 Microchannel chip
110 Substrate
111 First groove
112 Second groove
113 First recess
120 Film
130 First channel
131 Protrusion
133 Step
140 Liquid reservoir
150 Liquid introduction part
151 First taper part
152 Second taper part
160 Stop valve
170 Second channel
180 Fluid introduction part
181 Third taper part
182 Fourth taper part
190 Fluid discharging part

The invention claimed is:

1. A fluid handling device comprising:

a first channel configured for a flow of liquid therethrough by capillarity, the first channel including an upstream end and a downstream end;

a liquid reservoir configured to store liquid, the liquid reservoir including an upstream end and a downstream end, wherein the downstream end of the liquid reservoir being connected with the upstream end of the first channel;

a liquid introduction part including an opening part, a downstream end, and a taper part whose diameter decreases from the opening part toward the downstream end of the liquid introduction part, wherein the downstream end of the liquid introduction part being connected with the upstream end of the liquid reservoir;

a stop valve disposed at the downstream end of the first channel, the stop valve including a step part where a cross-sectional area of the channel sharply increases, the cross-sectional area being in a direction orthogonal to a direction in which liquid flows; and a second channel configured for a flow of liquid therethrough, and connected with the downstream end of the first channel.

2. The fluid handling device according to claim 1, wherein the second channel includes an internal wall, and wherein the downstream end of the first channel opens at the internal wall of the second channel.

3. The fluid handling device according to claim 1, further comprising a connecting part between the liquid reservoir and the liquid introduction part, wherein, in the direction orthogonal to the direction in which liquid flows through the connecting part between the liquid reservoir and the liquid introduction part, an area of the downstream end of the liquid introduction part is smaller than an area of the upstream end of the liquid reservoir.

4. The fluid handling device according to claim 2, further comprising a connecting part between the liquid reservoir and the liquid introduction part, wherein, in the direction orthogonal to the direction in which liquid flows through the connecting part between the liquid reservoir and the liquid introduction part, an area of the downstream end of the liquid introduction part is smaller than an area of the upstream end of the liquid reservoir.

* * * * *